United States Patent
Wang et al.

(10) Patent No.: US 11,416,112 B2
(45) Date of Patent: *Aug. 16, 2022

(54) METHOD AND DEVICE FOR DISPLAYING AN APPLICATION INTERFACE

(71) Applicant: Beijing Xiaomi Mobile Software Co., Ltd., Beijing (CN)

(72) Inventors: Le Wang, Beijing (CN); Minghao Li, Beijing (CN); Peng Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/743,692

(22) Filed: Jan. 15, 2020

(65) Prior Publication Data
US 2020/0150850 A1  May 14, 2020

Related U.S. Application Data

(63) Continuation of application No. 15/589,180, filed on May 8, 2017, now Pat. No. 10,599,288.

(30) Foreign Application Priority Data

May 9, 2016 (CN) .......................... 201610304869.4

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC ............. G06F 3/04817; G06F 3/04886; G06F 3/0481; G06F 9/451; G06F 3/0482; G06F 3/04845; G06F 2203/04803
See application file for complete search history.

(56) References Cited

U.S. PATENT DOCUMENTS 9,021,386 B1 * 4/2015 Rasmussen ......... G06F 3/04817
715/786
2005/0009161 A1   4/2005 Frei et al.
(Continued)

FOREIGN PATENT DOCUMENTS

CN    102331908    1/2012
CN    103440191    12/2013
(Continued)

OTHER PUBLICATIONS

Extended European Search Report issued for European application No. 17170177.4, dated Aug. 28, 2017.
(Continued)

*Primary Examiner* — Roberto Borja
(74) *Attorney, Agent, or Firm* — Finnegan, Henderson, Farabow, Garrett & Dunner, L.L.P.

(57) ABSTRACT

A method for displaying an application interface on a terminal. The method includes determining a first application of an application group. The application group includes multiple identical applications installed on the terminal, and the first application is a most recently used application of the multiple identical applications. The method further includes displaying application indication information in a specific area in an interface of the terminal, for indicating the first application.

15 Claims, 11 Drawing Sheets

(51) Int. Cl.
  *G06F 3/04845* (2022.01)
  *G06F 9/451* (2018.01)
  *G06F 3/04886* (2022.01)
  *G06F 3/0481* (2022.01)

(52) U.S. Cl.
  CPC ...... *G06F 3/04845* (2013.01); *G06F 3/04886* (2013.01); *G06F 9/451* (2018.02); *G06F 2203/04803* (2013.01)

(56) References Cited

U.S. PATENT DOCUMENTS

| | | |
|---|---|---|
| 2005/0283742 A1 | 12/2005 | Gusmorino et al. |
| 2006/0161861 A1 | 7/2006 | Holecek et al. |
| 2008/0155455 A1* | 6/2008 | Balasubramanian .... G09G 5/14 715/779 |
| 2008/0307364 A1 | 12/2008 | Chaudhri et al. |
| 2009/0138823 A1 | 5/2009 | Bradea et al. |
| 2010/0153844 A1 | 6/2010 | Hwang et al. |
| 2010/0211872 A1 | 8/2010 | Rolston et al. |
| 2011/0138295 A1 | 6/2011 | Momchilov et al. |
| 2011/0138314 A1 | 6/2011 | Mir et al. |
| 2013/0009990 A1 | 1/2013 | Hsu et al. |
| 2013/0091451 A1 | 4/2013 | Holecek |
| 2013/0120447 A1 | 5/2013 | Kim |
| 2014/0013336 A1 | 1/2014 | Yang et al. |
| 2014/0258914 A1 | 9/2014 | Mir et al. |
| 2014/0304616 A1* | 10/2014 | Park ...................... G06F 3/0488 715/752 |
| 2014/0324873 A1 | 10/2014 | Lee et al. |
| 2015/0056974 A1* | 2/2015 | Kim ........................ G06F 9/451 455/418 |
| 2015/0121281 A1* | 4/2015 | Sihn ...................... G06F 3/0488 715/772 |
| 2015/0178283 A1 | 6/2015 | Garg et al. |
| 2015/0199085 A1 | 7/2015 | Churchill et al. |
| 2016/0018970 A1 | 1/2016 | Chaudhri et al. |
| 2016/0210130 A1* | 7/2016 | Sankaranarasimhan ..................... G06F 21/53 |

FOREIGN PATENT DOCUMENTS

| | | |
|---|---|---|
| CN | 104081345 | 1/2014 |
| CN | 104199734 | 12/2014 |
| CN | 104462976 | 3/2015 |
| CN | 104866342 | 8/2015 |
| CN | 105224322 | 1/2016 |
| CN | 105224322 A * | 1/2016 |
| CN | 105550179 | 5/2016 |

OTHER PUBLICATIONS

International Search Report issued for International Application No. PCT/CN2016/100258, dated Jan. 26, 2017.
English version of Written Opinion of the International Search Authority issued for International Application No. PCT/CN2016/100258, dated Jan. 26, 2017.
First Office Action of the Chinese Application No. 201610304869.4, dated on Jul. 27, 2018.
Rita El Khoury, "App Cloner Creates Multiple Instances Of The Same App On Your Phone", Mar. 22, 2016, AndroidPolice.com.p. 1-2, (Year: 2016).

* cited by examiner

METHOD AND DEVICE FOR DISPLAYING AN APPLICATION INTERFACE

CROSS-REFERENCE TO RELATED APPLICATION

This application is a continuation of U.S. application Ser. No. 15/589,180, filed on May 8, 2017, which is based upon and claims priority to Chinese Patent Application No. 201610304869.4, filed on May 9, 2016, the entire contents of which are incorporated herein by reference.

TECHNICAL FIELD

The present disclosure relates to the field of computers, and more particularly, to a method and device for displaying an application interface.

BACKGROUND

With development of computer technologies, different applications may be installed for realizing different functions on a terminal, such as a mobile phone or a smart watch. A user may install two identical applications on the terminal when using the terminal. In conventional technologies, the terminal may run the two identical applications at the same time, and display identical interfaces. As such, it may be difficult for the user to determine which one of the two identical applications corresponds to a currently displayed interface.

SUMMARY

According to a first aspect of the present disclosure, there is provided a method for displaying an application interface on a terminal. The method comprises determining a first application of an application group. The application group includes multiple identical applications installed on the terminal, and the first application is a most recently used application of the multiple identical applications. The method further comprises displaying application indication information in a specific area in an interface of the terminal, for indicating the first application.

According to a second aspect of the present disclosure, there is provided a device for displaying an application interface. The device comprises a processor and a memory for storing instructions executable by the processor. The processor is configured to determine a first application of an application group. The application group includes multiple identical applications installed on the device, and the first application is a most recently used application of the multiple identical applications. The processor is further configured to display application indication information in a specific area in an interface of the device for indicating the first application.

According to a third aspect of the present disclosure, there is provided a non-transitory computer-readable storage medium having stored therein instructions that, when executed by a processor of a terminal, cause the terminal to perform a method for displaying an application interface. The method comprises determining a first application of an application group. The application group includes multiple identical applications installed on the terminal, and the first application is a most recently used application of the multiple identical applications. The method further comprises displaying application indication information in a specific area in an interface of the terminal for indicating the first application.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1:
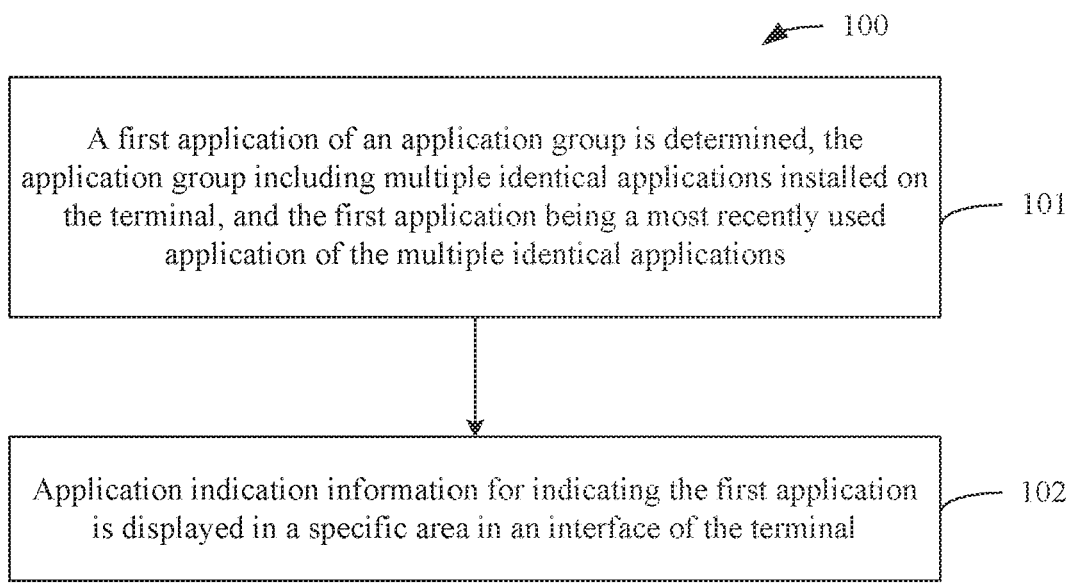
FIG. 1 is a flow chart of a method for displaying an application interface according to an exemplary embodiment.

FIG. 1 is a flow chart of a method 100 for displaying an application interface according to an exemplary embodiment. The method 100 may be applied to a terminal, and includes the following steps.

In step 101, a first application of an application group is determined, the application group including multiple identical applications installed on the terminal, and the first application being a most recently used application by a user of the multiple identical applications.

In step 102, application indication information for indicating the first application is displayed in a specific area in an interface of the terminal. The specific area of the interface may include, but is not limited to, a system status bar, a system notification bar, a display area containing an icon of an application of the application group, or a taskbar.

By using the methods 100, the first application may be accurately distinguished from other identical application(s) of the application group. Accordingly, display of the multiple identical applications of the application group may be improved.

In some embodiments, the application indication information includes an identifier or an icon of the application group. The identifier and the icon may each indicate that the application group includes multiple identical applications.

In some embodiments, step 102 includes determining whether the first application is running in a foreground of the terminal. When it is determined that the first application is running in the foreground of the terminal, the application indication information is displayed in a system status bar of the terminal.

In some embodiments, step 102 includes displaying in a system notification bar of the terminal a notification message sent for the first application, when the notification message is received, and displaying an icon of the first application at a position for displaying the notification message. The identifier of the first application may indicate that the first application is one of the multiple identical applications.

In some embodiments, step 102 includes setting an icon of the first application in a taskbar of the terminal, the icon of the first application indicating that the first application is one of the multiple identical applications. At least one icon is contained in the taskbar and the at least one icon includes icons of currently running applications.

In some embodiments, prior to step 102, the method 100 may further include acquiring an original icon of the first application, and adding the identifier of the application group at a specific position on the original icon to obtain the icon of the first application. The specific position on the original icon may include, but is not limited to, a lower or upper left corner, a lower or upper right corner, or a left or right side, of the original icon.

In some embodiments, the first application is a mirror application of the application group. The multiple identical applications of the application group may include an original application and at least one mirror application of the original application.

Figure 2A:
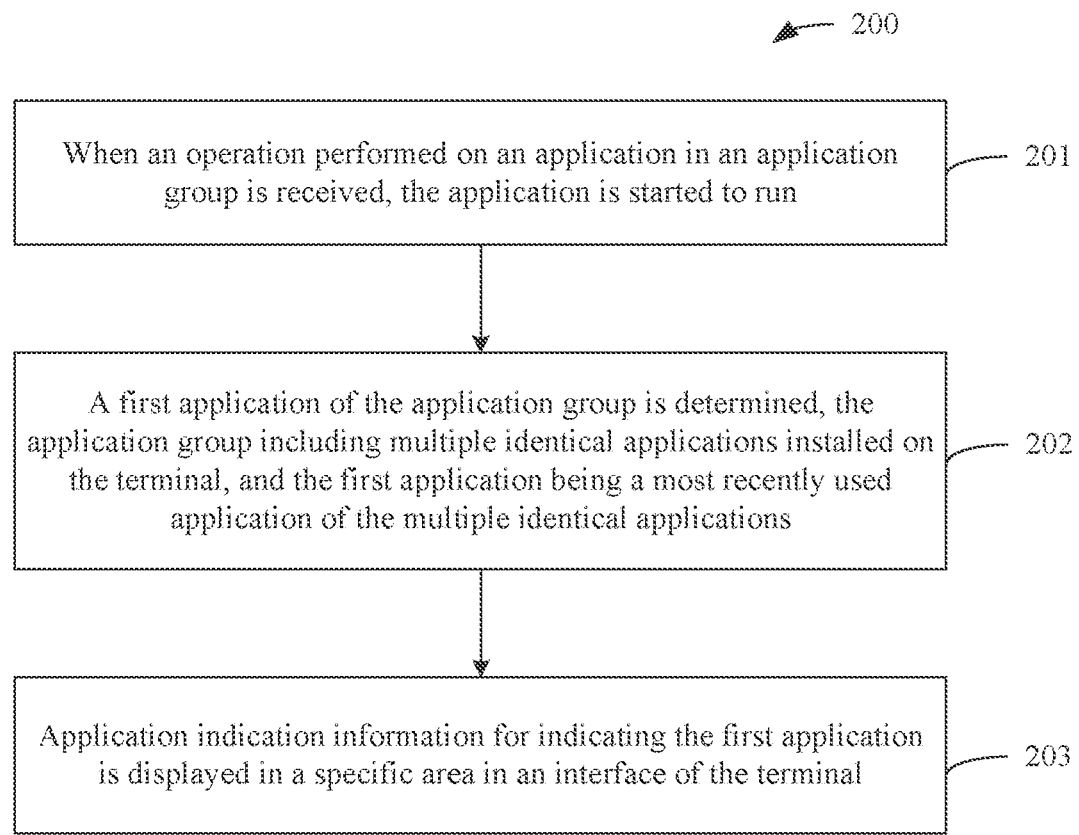
FIG. 2A is a flow chart of a method for displaying an application interface according to another exemplary embodiment.

FIG. 2A is a flow chart of a method 200 for displaying an application interface according to another exemplary embodiment. The method 200 may be applied to a terminal, and includes the following steps.

In step 201, when an operation performed on an application in an application group is received, the application is started to run.

In the exemplary embodiment, a user may install multiple identical applications on the terminal to create the application group. The multiple identical applications may include an original application and at least one mirror application of the original application. For example, the user may install multiple identical instant messaging applications in the terminal and configure the identical instant messaging applications for different social occasions respectively. Thus, the terminal may run any application of the application group after the application group is created.

The operation performed on the application may include, but is not limited to, a clicking operation, a swiping operation, etc. The multiple identical applications may run simultaneously. The at least one mirror application may be obtained by copying the original application.

Each application may have a unique application identifier for indicating identity information of the application. When the application is installed in the terminal, the application identifier of the application is required to be stored in a system file of the terminal to register the application. Thus, when a mirror application identical to an original application is installed in the terminal, that is, the original application is copied, the application identifier of the original application may be modified, to determine an application identifier of the mirror application. The application identifier of the mirror application is then stored in the system file of the terminal to register the mirror application so as to install the mirror application.

With regard to methods for installing multiple identical applications in the terminal to further obtain an original application and at least one mirror application of the original application, any related technology may be referred to, and the methods will not be specifically limited in the embodiments of the present disclosure.

For example, three identical instant messaging applications "X communication" are installed in a terminal to create an X communication application group. The X communication application group includes the three identical X communication applications, wherein one X communication application is set to be an original application, and the other two X communication applications are mirror applications.

In some embodiments, a plurality of types of applications may be installed in the terminal. For each type of application, multiple identical applications of the type may be installed in the terminal to create an application group for the type of application. That is, a plurality of application groups may be created in the terminal, with each application group corresponding to one type of application.

After the terminal runs applications of the application group, a first application of the application group may be indicated according to the following steps, for conveniently distinguishing the first application from other identical application(s) of the application group.

In step 202, a first application of the application group is determined, the first application being a most recently used application by a user of the multiple identical applications.

Since the application group includes multiple identical applications and the terminal may run identical display interfaces for running the multiple applications, the first application that is most recently used, may be determined to conveniently distinguish other identical application(s).

In some embodiments, a timing for performing step 202 may vary. For example, the terminal may perform step 202 at a preset time interval. Alternatively, the terminal may perform step 202 when an instruction for distinguishing applications is received. There are no limits to the timing in the embodiments of the present disclosure.

The preset time interval may be set by the terminal prior to performing step 202. For example, the preset time interval may be 5 ms, 10 ms, or any other value. There are no limits to the preset time interval in the embodiments of the present disclosure.

In some embodiments, the instruction for distinguishing applications may be triggered when a user performs a preset operation. The preset operation may include, but is not limited to, a clicking operation, a swiping operation, or, a shaking operation.

In some embodiments, the first application may be a mirror application of the application group. In such case, when the application group includes only one mirror application, the first application is the mirror application. When the application group includes a plurality of mirror applications, the first application may be a mirror application that is most recently used among the plurality of mirror applications. Alternatively, the first application may also include the plurality of mirror applications, that is, all of the mirror applications of the application group are determined as the first application. For example, when the application group includes two mirror applications, the two mirror applications may both be determined as the first application.

In some embodiments, the first application may be a specified application of the application group. The plurality of identical applications included in the application group may be configured for different occasions respectively. The user may not concern about which application is an original application and which application is a mirror application. Rather, the user may need to determine whether an application that is most recently used is an application configured to a specific occasion. Accordingly, the specified application of the application group may be determined as the first application to improve the distinguishing of the identical applications in the application group.

In a situation where the first application is the specified application of the application group, the terminal may display selection prompting information before determining the first application that is most recently used. The selection prompt information is configured to prompt the user to select an application from the application group. When a selection instruction is received for the application group, an application selected by the selection instruction may be determined as the first application. The selection prompt information may be displayed in a popup window, other types of windows, or the like, which are not limited in the embodiments of the present disclosure.

In some embodiments, the selection instruction may be triggered when the user performs a preset operation. For example, in the X communication application group, the three identical X communication applications may be referred to as an X communication application 1, an X communication application 2, and an X communication application 3, respectively. The X communication application 1 is an original application, the X communication application 2 and X communication application 3 are mirror applications. In the exemplary embodiment, the X communication application 3 is specified as the first application. Accordingly, the terminal may determine the first application of the X communication application group to be the X communication application 3. In this way, the X communication application 3 is distinguished from the other X communication applications of the X communication application group.

In some embodiments, the first application may be an application of the application group that is installed most recently on the terminal compared with other applications of the application group. There are no limits to how the first application of the application group is determined in the embodiments of the present disclosure.

In some embodiments, the application group may be any application group of a plurality of application groups created in the terminal. In this case, for each group of the plurality of application groups, the terminal may perform step 202 to determine the first application of the application group.

In step 203, prompt information for indicating the first application is displayed in a specific area in an interface of the terminal.

In the exemplary embodiment, the application group includes the multiple identical applications. It may be difficult for the user to distinguish the identical applications when display interfaces for running the identical applications are identical. As such, after the first application of the application group is determined, the application indication information may be displayed in the specific area in the interface of the terminal to prompt the user about the first application. The specific area of the interface may include, but is not limited to, a system status bar of the terminal, a system notification bar of the terminal, a display area containing an icon of any application of the application group, or a taskbar of the terminal.

In some embodiments, the application indication information may include an identifier or an icon of the application group. The identifier may include, but is not limited to, a number, a letter, a special character, a graphic, and a picture. The icon of the first application may be obtained by adding the identifier to an original icon of the first application by the terminal.

In some embodiments, the terminal may set the identifier for the application group before displaying the application indication information in the specific area in the interface of the terminal. For example, the terminal may randomly set the identifier for the application group when installing the applications of the application group. Alternatively, the terminal may set the identifier for the application group when running any application of the application group. There are no limits to a timing for setting the identifier in the embodiments of the present disclosure.

In some embodiments, when the terminal sets the identifier for the application group, the terminal may randomly select an identifier such as a number, a letter, a special character or a special symbol for the application group, and determine the randomly selected identifier as the identifier of the application group. In the case, when the terminal randomly selects an identifier and determines the selected identifier as the identifier of the application group, interactions between the terminal and the user are reduced, and the efficiency of setting the identifier is improved.

In some embodiments, when the terminal sets the identifier for the application group, first setting prompt information is displayed. The first setting prompt information includes a plurality of identifiers and is configured to prompt the user to select an identifier from the plurality of identifiers. When a first setting instruction based on the plurality of identifiers is received, an identifier selected according to the first setting instruction is determined as the identifier of the application group.

When the terminal determines the identifier selected according to the first setting instruction as the identifier of the application group, flexibility in setting the identifier is improved due to that the identifier is determined by the user. Further, distinguishing the first application according to the identifier by the user is also improved.

The terminal may display the first setting prompt information in the manner of a popup display, a window display or the like, which will not be limited in the embodiments of the present disclosure.

Figure 2B:
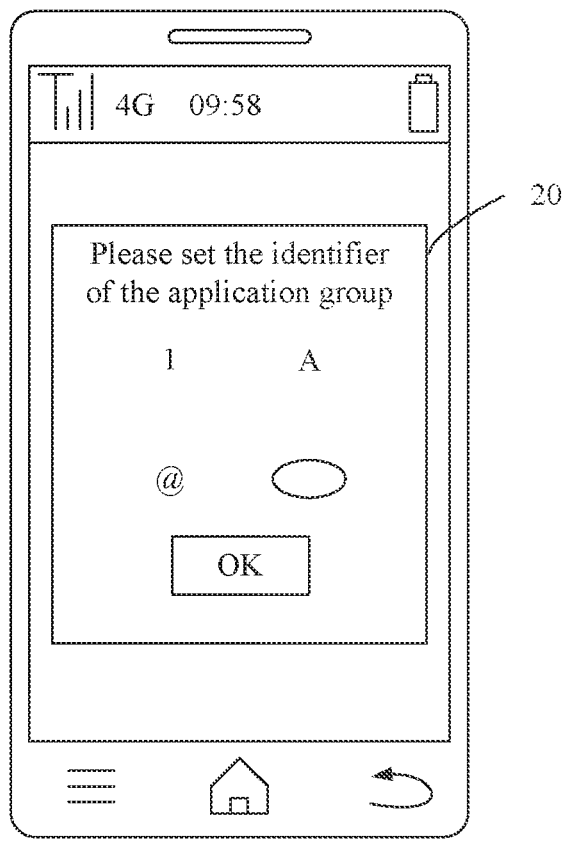
FIG. 2B is a schematic diagram of a display interface of a terminal according to an exemplary embodiment.

In some embodiments, the first setting instruction may be triggered when the user performs a preset operation. For example, when the terminal sets an identifier for the X communication application group on a terminal 200b shown in FIG. 2B, first setting prompt information 20 is displayed to prompt the user to select an identifier from four identifiers: a number 1, a letter A, a special symbol @ and an ellipse. When a first setting instruction is received based on the identifiers and an identifier selected according to the first setting instruction is the ellipse, the ellipse is determined as the identifier of the X communication application group.

In some embodiments, when the terminal sets the identifier for the application group, second setting prompt information is displayed. The second setting prompt information is configured to prompt the user to input an identifier. When the identifier input by the user is received based on the second setting prompting information, the identifier input by the user is determined as the identifier of the application group. In this case, when the terminal determines the identifier input by the user as the identifier of the application group (i.e., the identifier is customized by the user), the flexibility in setting the identifier may be further improved. Accordingly, distinguishing the first application by the user according to the identifier may also be further improved.

The terminal displays the second setting prompt information in the manner of a popup display, a window display or the like, which will not be limited in the embodiments of the present disclosure.

As aforementioned, the application group includes the multiple identical applications, including the original application and the at least one mirror application, and the first application may be specified by the user. Thus, the first application may be the original application. When a plurality of identifiers are set for the application group, the plurality of identifiers may correspond to the multiple identical applications of the application group in an one-to-one relationship.

In such case, when each application of the application group may correspond to an identifier, the terminal may distinguish each application of the application group on the basis of the plurality of identifiers As such, displaying the multiple identical applications of the application group is improved, and distinguishing the multiple identical applications of the application group is also improved.

The plurality of identifiers may be identifiers of a same type or of different types. For example, the plurality of identifiers may all be numbers such as 1, 2, 3 and the like, or may also be of multiple types such as 1, A, @, and so on. There are no limits to the identifier type in the embodiments of the present disclosure.

Figure 2C:
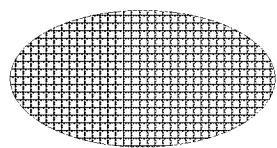
FIG. 2C is a schematic diagram of an application identifier according to an exemplary embodiment.
Figure 2D:
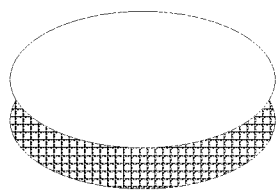
FIG. 2D is a schematic diagram of an application identifier according to another exemplary embodiment.
Figure 2E:
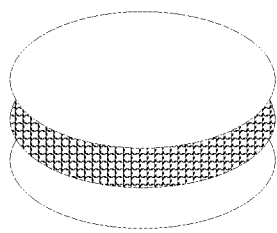
FIG. 2E is a schematic diagram of an application identifier according to yet another exemplary embodiment.

For example, the terminal sets a group of identifiers for the X communication application group, including three identifiers. The X communication application 1 corresponds to an identifier 1, as shown in FIG. 2C; the X communication application 2 corresponds to an identifier 2, as shown in FIG. 2D; and the X communication application 3 corresponds to an identifier 3, as shown in FIG. 2E.

In some embodiments, when the terminal sets a group of identifiers for the application group, the group of identifiers may not correspond to the applications of the application group in an one-to-one relationship. That is, the number of the identifiers in the group may be greater than or equal to the number of the identical applications of the application group. When the application indication information is displayed in the specific area in the interface of the terminal, an identifier is randomly selected from the identifiers in the group.

In some embodiments, the terminal acquires the original icon of the first application before displaying the application prompting information in the specific area in the interface of the terminal, and adds the identifier of the application group at a specific position on the original icon to obtain the icon of the first application.

If the terminal sets the group of identifiers for the application group, the terminal may acquire the original icon of the first application and the identifier corresponding to the first application, and add the identifier corresponding to the first application to the original icon at a specific position on the original icon, to obtain an icon of the first application for use in the application group.

The specific position on the original icon may include, but is not limited to, a lower or upper left corner, a lower or upper right corner, or a left or right side, of the original icon.

Figure 2F:
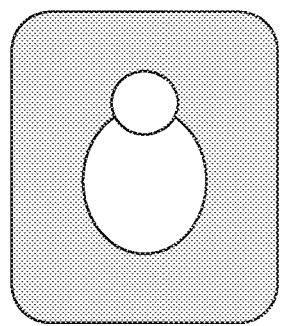
FIG. 2F is a schematic diagram of an original icon of an application according to an exemplary embodiment.
Figure 2G:
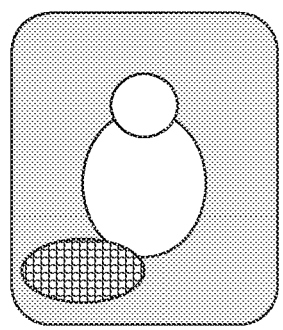
FIG. 2G is a schematic diagram of a modified icon of an application according to an exemplary embodiment.
Figure 2H:
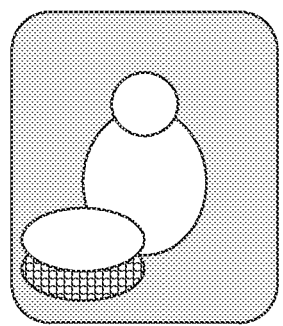
FIG. 2H is a schematic diagram of a modified icon of an application according to another exemplary embodiment.
Figure 2I:
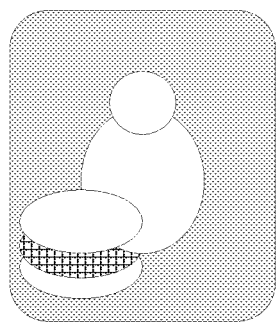
FIG. 2I is a schematic diagram of a modified icon of an application according to yet another exemplary embodiment.

For example, in the X communication application group, the X communication application 1 is the original application having an original icon shown in FIG. 2F. Original icons of the X communication application 2 and the X communication application 3 are the same as the original icon of the X communication application 1. The X communication application 1 corresponds to the identifier 1 shown in FIG. 2C, the X communication application 2 corresponds to the identifier 2 shown in FIG. 2D, and the X communication application 3 corresponds to the identifier 3 shown in FIG. 2E. Therefore, the identifier 1 may be added to the left lower corner of the original icon of the X communication application 1 to obtain a modified icon 1 of the X communication application 1 for use in the application group, as shown in FIG. 2G; the identifier 2 may be added to the left lower corner of the original icon of the X communication application 2 to obtain a modified icon 2 of the X communication application 2 for use in the application group, as shown in FIG. 2H; and the identifier 3 may be added to the left lower corner of the original icon of the X communication application 3 to obtain a modified icon 3 of the X communication application 3 for use in the application group, as shown in FIG. 2I.

In some embodiments, the icon of the first application may also be obtained by modifying the original icon of the original application of the application group by the terminal, for example, by turning around the original icon. There are no limits to how to obtain the icon of the first application in the embodiments of the present disclosure.

Figure 2J:
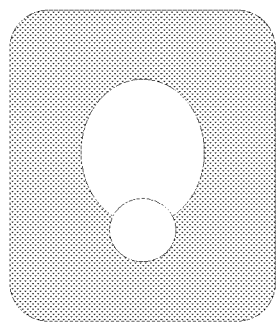
FIG. 2J is a schematic diagram of a modified icon of an application according to still yet another exemplary embodiment.

For example, the X communication application group may further include an X communication application 4 which is a mirror application of the X communication application 1 (i.e., the original application). an icon (shown in FIG. 2J) of the X communication application 4 may be obtained by overturning the original icon (shown in FIG. 2F) of the X communication application 1.

In some embodiment, when the original icons of the respective applications of the application group are different from each other, the application indication information may further include the original icon of the first application.

In some embodiments, displaying the application indication information in the specific area in the interface of the terminal may include determining whether the first application of the application group is running in a foreground of the terminal. When the first application of the application group is running in the foreground, the application indication information is displayed in the system status bar of the terminal.

In such case, when the first application is running in the foreground, the interface for the terminal to run the first application has indicated that the currently running application is an application of the application group. Thus the application indication information may be an identifier to further indicate that the application currently running in the foreground is the first application of the application group. Accordingly, the first application may be accurately distinguished from the other applications of the application group.

In a situation where the first application of the application group is not running in the foreground, the icon of the first application may also be displayed in the system status bar of the terminal to indicate that applications running on the terminal include the first application of the application group running in the background.

Figure 2K:
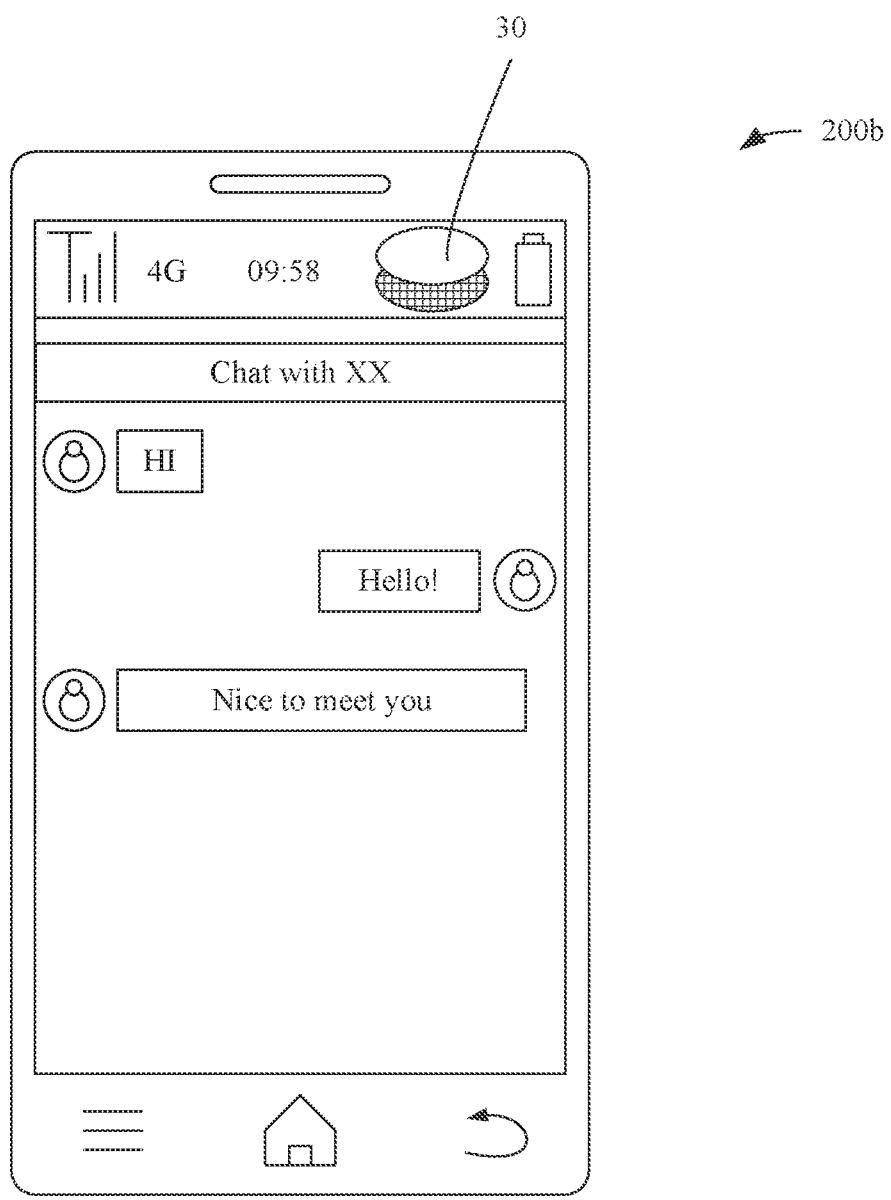
FIG. 2K is a schematic diagram of a display interface of a terminal according to an exemplary embodiment.
Figure 2L:
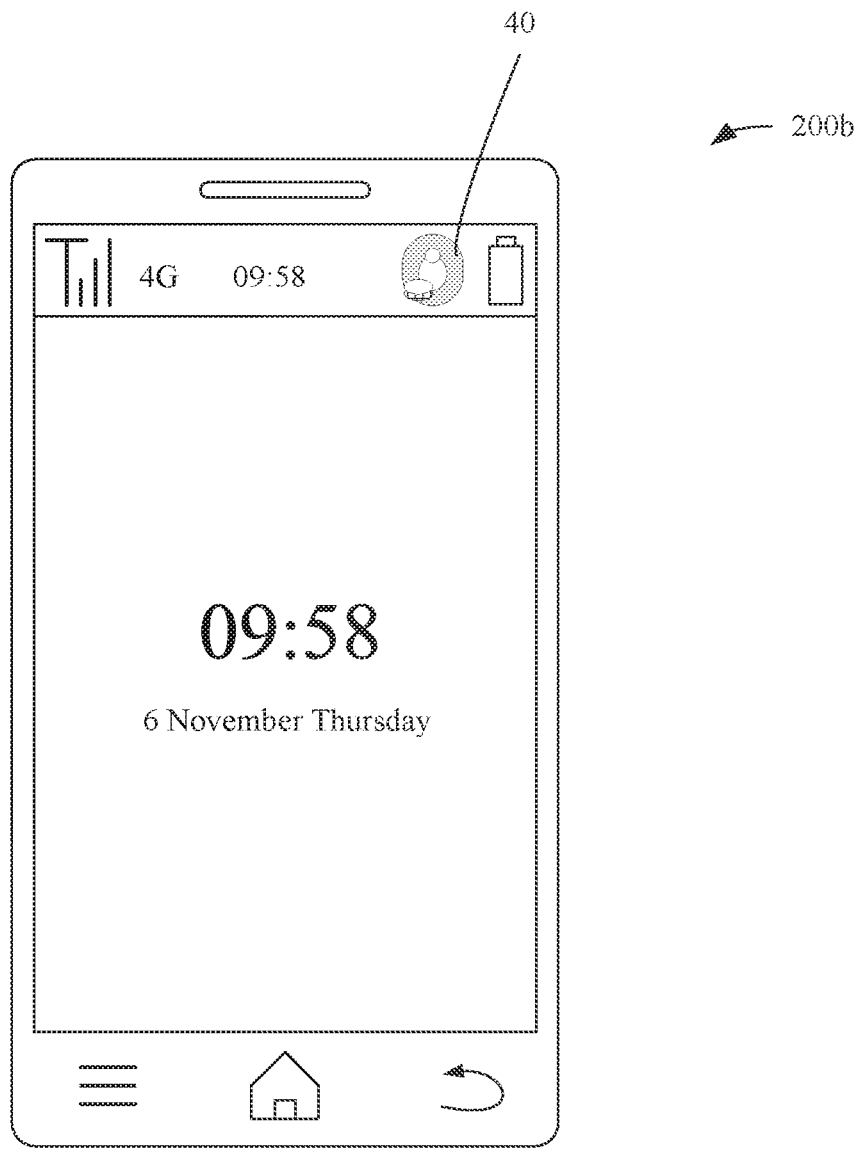
FIG. 2L is a schematic diagram of a display interface of a terminal according to another exemplary embodiment.

For example, when the first application is the X communication application 2 currently running in the foreground of the terminal, the identifier 2 of the X communication application 2 is displayed in the system status bar of the terminal, as indicated by reference numeral 30 in FIG. 2K. When the first application is the X communication application 2 not currently running in the foreground of the terminal, the icon 2 of the X communication application 2 is displayed in the system status bar of the terminal, as indicated by reference numeral 40 in FIG. 2L.

In some embodiments, when a notification message sent for the first application is received, the notification message is displayed in the system notification bar of the terminal. The icon of the first application is displayed at a position where the notification message is displayed.

In such case, for each application of the multiple identical applications of the application group, the terminal may receive a notification message for the application. When the terminal receives the notification message sent for the first application, the first application may not run at present. Thus, the first application may be started to run to indicate that the currently received notification message is sent for the first application. To further distinguish the first application from the other applications of the application group, the notification message may be displayed in the system notification bar of the terminal and the icon of the first application may be displayed at the display position where the notification message is displayed.

The notification message may be sent by a server corresponding to the application or sent by another terminal, which will not be specifically limited in the embodiments of the present disclosure.

Figure 2M:
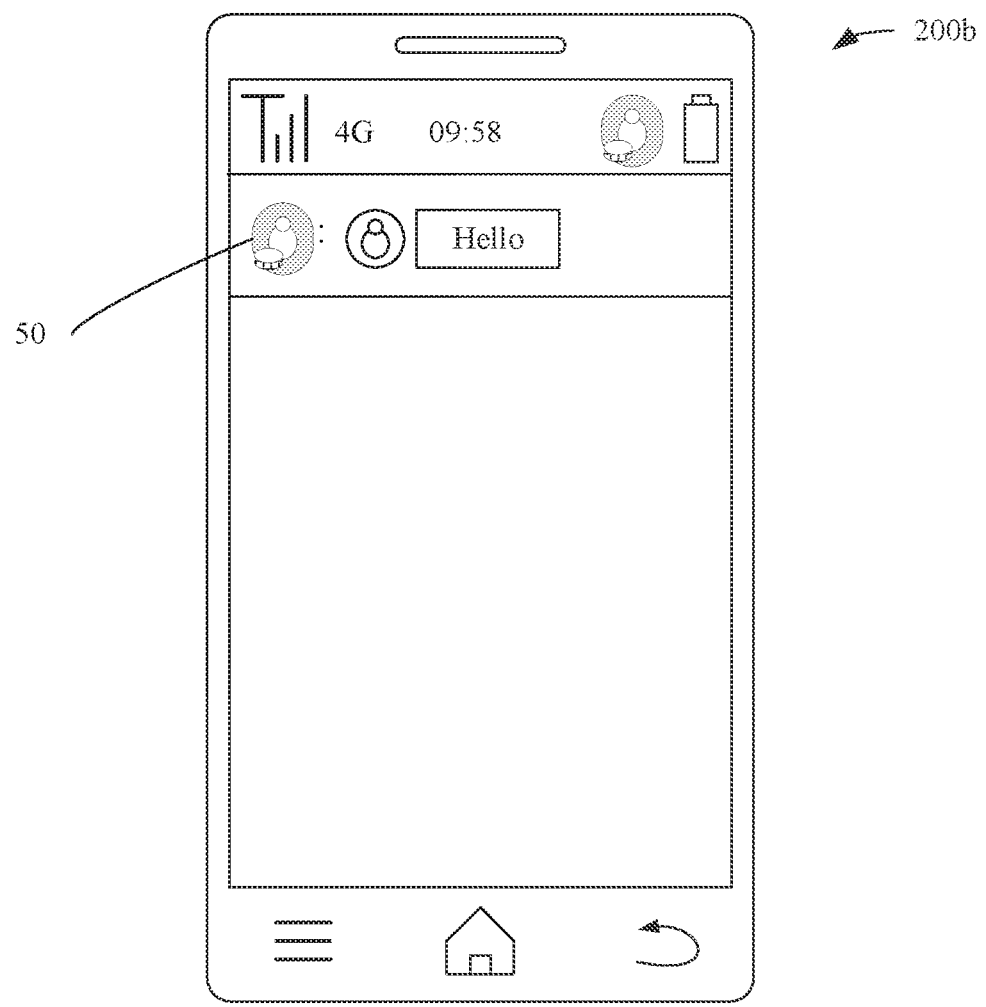
FIG. 2M is a schematic diagram of a display interface of a terminal according to yet another exemplary embodiment.

For example, when the first application is the X communication application 2 and the terminal receives a notification message "hello" sent for the X communication application 2, the notification message "hello" is displayed in the notification bar of the terminal, and the icon of the X communication application 2 is displayed at a position where the notification message is displayed, as indicated by reference numeral 50 in FIG. 2M.

In some embodiments, to display the application indication information in the specific area of the interface of the terminal, an icon of the first application in the taskbar of the terminal is set. At least one icon, which includes icons of applications currently in a running status, is contained in the taskbar.

The system status bar of the terminal may be limited in space, and thus there may not be sufficient space for displaying the application indication information. In addition, the taskbar of the terminal may usually include at least one icon of applications currently in the running status. Therefore, the icon of the first application in the taskbar may be set to ensure that the first application may be distinguished from the other applications of the application group. Accordingly, the accuracy of distinguishing the first application from the other applications of the application group is improved.

In some embodiments, the terminal may also display the application indication information in the specific area in the interface of the terminal via other manners. For example, the icon of the first application in a desktop of the terminal is set. There are no specific limits made in the embodiments of the present disclosure.

Figure 2N:
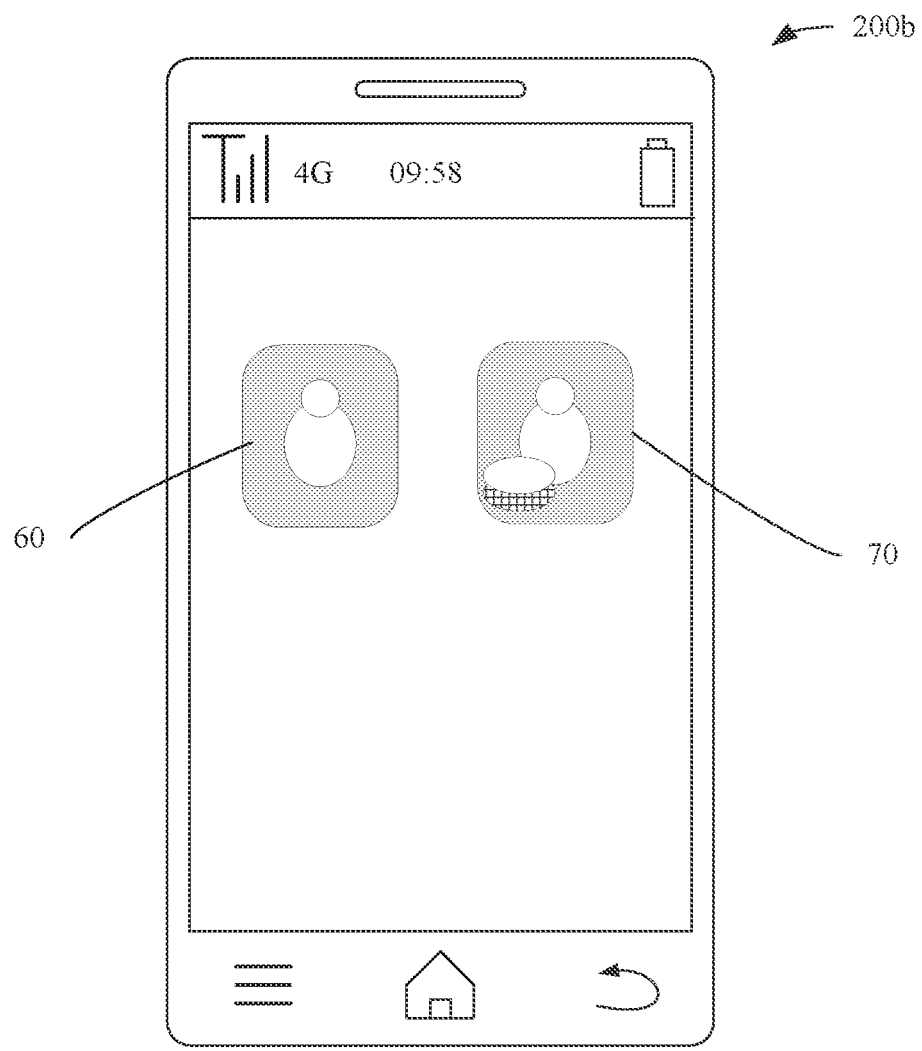
FIG. 2N is a schematic diagram of a display interface of a terminal according to still yet another exemplary embodiment.

For example, as shown in FIG. 2N, two icons are included in the desktop of the terminal 200b. A first icon 60 is the icon of the X communication application 1 of the X communication application group. The X communication application 1 is the original application, and the icon 60 is the original icon of the X communication application 1. A second icon 70 is the icon of the X communication application 2 of the X communication application group. The X communication application 2 is the first application, and the icon 70 is the icon of the X communication application 2.

Furthermore, as described from the above, for each application group of the plurality of application groups, the terminal may determine a first application that is most recently used by the user. Thus, the terminal may also display application indication information in a specific area in an interface of the terminal for indicating the first application of the application group after determining the first application.

In the exemplary embodiments of the present disclosure, the terminal may determine the first application, which is most recently used, of the application group and display the application indication information in the specific area in the interface of the terminal for indicating the first application. The first application may be accurately distinguished from other applications of the application group. In addition, the first application may be a mirror application, that is, the application indication information is only displayed for the mirror application of the application group to further better distinguish the mirror application from the original application of the application group. Thus, the accuracy of distinguishing the multiple identical applications of the application group is further improved. Additionally, the application indication information may include the identifier or icon of the application group. When the first application is in the foreground running status, the identifier or the icon is displayed in the system status bar of the terminal. When the first application is not in the foreground running status, the icon may also be displayed in the system status bar of the terminal. Thus, flexibility in displaying the application indication information is improved.

Figure 3:
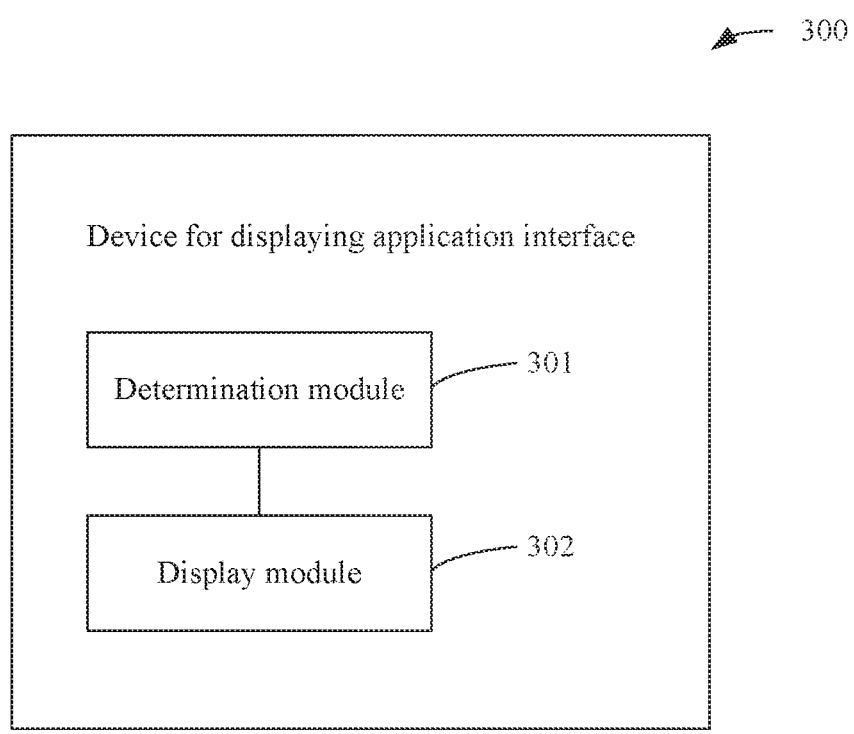
FIG. 3 is a block diagram of a device for displaying an application interface according to an exemplary embodiment

FIG. 3 is a block diagram of a device 300 for displaying an application interface, according to an exemplary embodiment. The device 300 may include a determination module 301 and a display module 302.

The determination module 301 is configured to determine a first application, of an application group, the application group including multiple identical applications, and the first application being a most recently used application by a user of the multiple identical applications.

The display module 302 is configured to display application indication information in a specific area in an interface of the device 300, for indicating the first application.

In some embodiments, the application indication information may include an identifier or an icon of the application group.

In some embodiments, the display module 302 may include a judgment unit and a first display unit.

The judgment unit is configured to judge whether the first application of the application group is in a foreground running status.

The first display unit is configured to display the application indication information in a system status bar of the device 300 when the first application of the application group is in the foreground running status.

In some embodiment, the display module 302 may further include a second display unit and a third display unit.

The second display unit is configured to display a notification message, which is sent for the first application, in a system notification bar of the device 300 when the notification message is received.

The third display unit is configured to display an icon of the first application at a position for displaying the notification message.

In some embodiments, the display module 302 may further include a fourth display unit.

The fourth display unit is configured to set an icon of the first application in a taskbar of the device 300, and at least one icon, which includes icons of applications currently in a running status, is contained in the taskbar.

In some embodiments, the device 300 may further include an acquisition module and an addition module.

The acquisition module is configured to acquire an original icon of the first application.

The addition module is configured to add the identifier of the application group at a specific position on the original icon to obtain the icon of the first application.

In some embodiments, the first application is a mirror application of the application group.

In the exemplary embodiment of the present disclosure, the device 300 may determine the first application, which is a most recently used application, of the application group and display the application indication information in the specific area in the interface of the device 300 for indicating the first application. The first application may thus be accurately distinguished from other applications of the application group. Accordingly, displaying multiple identical applications of the application group is improved.

With respect to the device 300, specific manners by which the various modules perform operations have been described in detail in the exemplary embodiments regarding the methods, which will not be repeated herein.

Figure 4:
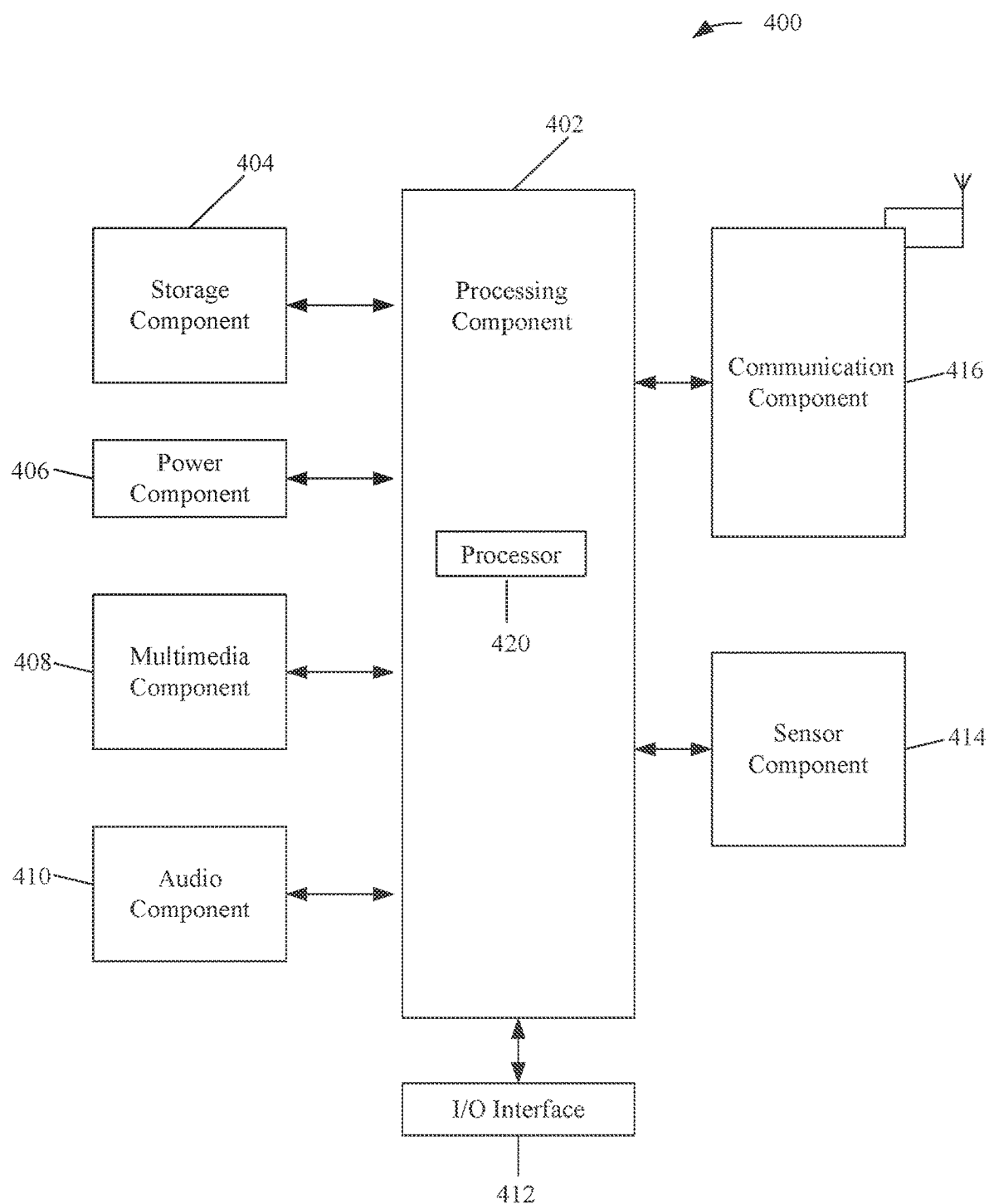
FIG. 4 is a block diagram of a terminal for displaying an application interface according to an exemplary embodiment.

FIG. 4 is a block diagram of a terminal 400 for displaying an application interface according to an exemplary embodiment. For example, the terminal 400 may be a mobile phone, a digital broadcast terminal, a messaging device, a gaming console, a tablet, a medical device, exercise equipment, a personal digital assistant, or the like.

Referring to FIG. 4, the terminal 400 may include one or more of a processing component 402, a storage component 404, a power component 406, a multimedia component 408, an audio component 410, an Input/Output (I/O) interface 412, a sensor component 414, and a communication component 416.

The processing component 402 typically controls overall operations of the terminal 400, such as the operations associated with display, telephone calls, data communications, camera operations, and recording operations. The processing component 402 may include one or more processors 420 for executing instructions to perform all or part of the steps in the abovementioned method. Moreover, the processing component 402 may include one or more modules which facilitate interactions between the processing component 402 and the other components. For instance, the processing component 402 may include a multimedia module to facilitate interactions between the multimedia component 408 and the processing component 402.

The storage component 404 is configured to store various types of data to support the operation of the terminal 400. Examples of such data include instructions configured for any application programs or methods operated on the terminal 400, contact data, phonebook data, messages, pictures, video, etc. The storage component 404 may be implemented by any type of volatile or non-volatile memory devices, or a combination thereof, such as a Static Random Access Memory (SRAM Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the terminal 400. The power component 406 may include a power management system, one or more power supplies, and other components associated with the generation, management and distribution of power for the terminal 400.

The multimedia component 408 may include a screen providing an output interface between the terminal 400 and a user. In some embodiments, the screen may include a liquid crystal display (LCD) and a touch panel. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 408 includes a front camera and/or a rear camera. The front camera and/or the rear camera may receive external multimedia data when the terminal 400 is in an operation mode, such as a photographing mode or a video mode. Each of the front camera and the rear camera may be a fixed optical lens system or have capabilities of focusing and optical zooming.

The audio component 410 is configured to output and/or input an audio signal. For example, the audio component 410 may include a microphone which is configured to receive an external audio signal when the terminal 400 is in the operation mode, such as a call mode, a recording mode and a voice recognition mode. The received audio signal may be further stored in the storage component 404 or sent through the communication component 416. In some embodiments, the audio component 410 further includes a speaker configured to output the audio signal.

The I/O interface 412 provides an interface between the processing component 402 and a peripheral interface module which may be a keyboard, a click wheel, a button or the like. The button may include, but not limited to, a home button, a volume button, a starting button and a locking button.

The sensor component 414 includes one or more sensors configured to provide status assessment in various aspects for the terminal 400. For instance, the sensor component 414 may detect an on/off status of the terminal 400 and relative positioning of components, such as a display and small keyboard of the terminal 400, and the sensor component 414 may further detect a change in a position of the terminal 400 or a component of the terminal 400, presence or absence of contact between the user and the terminal 400, orientation or acceleration/deceleration of the terminal 400 and a change in temperature of the terminal 400. The sensor component 414 may include a proximity sensor configured to detect presence of an object nearby without any physical contact. The sensor component 414 may also include a optical sensor, such as a complementary metal oxide semiconductor (CMOS) or charge coupled device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the terminal 400 and another device. The terminal 400 may access a communication-standard-based wireless network, such as a Wireless Fidelity (WiFi) network, a 2nd-Generation (2G) or 3rd-Generation (3G) network or a combination thereof. In an exemplary embodiment, the communication component 416 receives a broadcast signal from an external broadcast management system or broadcast associated information through a broadcast channel. In an exemplary embodiment, the communication component 416 further includes a near field communication (NFC) module to facilitate short-range communication. For example, the NFC module may be implemented on the basis of a radio frequency identification (RFID) technology, an infrared data association (IrDA) technology, an ultra-wideband (UWB) technology, a Bluetooth (BT) technology and another technology.

In an exemplary embodiment, the terminal 400 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components which are configured to perform the abovementioned method.

In some embodiments, a non-transitory computer-readable storage medium having instructions stored thereon is provided, such as the storage component 404 having stored thereon instructions which may be executed by the processor 420 of the terminal 400 to implement the abovementioned methods. For example, the non-transitory computer-readable storage medium may be a ROM, a compact disc read-only memory (CD-ROM), a magnetic tape, a floppy disc, an optical data storage device, or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be conceived by those skilled in the art from consideration of the specification and practice of the present disclosure. This application is intended to cover any variations, uses, or adaptations of the embodiments of the present disclosure following the general principles of the embodiments of the present disclosure and including common knowledge or conventional technical means in the art which is/are not disclosed in the embodiments of the present disclosure. It is intended that the specification and embodiments are considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only is limited by the appended claims.

What is claimed is:

1. A method for displaying an application interface on a terminal, comprising:
   displaying selection prompting information for prompting a user to select an application from an application group, the application group comprising multiple identical applications that comprise a first application;
   determining the first application selected by the user in response to the selection prompting information, the first application being a specified application of the application group;
   acquiring an original icon of the first application;
   adding an identifier of the application group at a specific position on the original icon, to obtain an icon of the first application, wherein each application of the application group corresponds to an identifier, and the applications of the application group are distinguished based on the identifiers; and
   displaying application indication information in a specific area in an interface of the terminal, for indicating the specified application of the application group, wherein the application indication information comprises at least one of the identifier or an icon of the application group, and the specific area comprises one or more of a system status bar, a system notification bar, a taskbar, and a display area containing an icon of any application of the application group,
   wherein displaying the application indication information in the specific area in the interface of the terminal comprises:
   displaying a notification message sent for the first application, in the system notification bar of the terminal, when the notification message is received; and
   displaying the icon of the first application together with the notification message.

2. The method according to claim 1, wherein displaying the application indication information in the specific area in the interface of the terminal comprises:
   setting the icon of the first application in the taskbar of the terminal to indicate that the first application is one of the multiple identical applications in the application group, at least one icon being contained in the taskbar and the at least one icon corresponding to an application currently in a running status.

3. The method according to claim 1, wherein applications in the application group have identical original icons.

4. The method according to claim 1, wherein the notification message is sent by a server corresponding to the first application, or another terminal.

5. The method according to claim 1, wherein the application group includes an original application and the specified application corresponding to different application identifiers, respectively, and
   wherein the specified application is generated by: modifying the application identifier of the original application, and storing the modified application identifier of the original application in a system file of the terminal as the application identifier of the specified application.

6. A device for displaying an application interface, comprising:
- a processor; and
- a memory for storing instructions executable by the processor;
- wherein the processor is configured to:
- control a display to display selection prompting information for prompting a user to select an application from an application group, the application group comprising multiple identical applications that comprise a first application;
- determine the first application selected by the user in response to the selection prompting information, the first application being a specified application of the application group;
- acquire an original icon of the first application;
- add an identifier of the application group at a specific position on the original icon, to obtain an icon of the first application, wherein each application of the application group corresponds to an identifier, and the applications of the application group are distinguished based on the identifiers; and
- display application indication information in a specific area in an interface of the device, for indicating the specified application of the application group, wherein the application indication information comprises at least one of the identifier or an icon of the application group, and the specific area comprises one or more of a system status bar, a system notification bar, a taskbar, and a display area containing an icon of any application of the application group,
- wherein in displaying the application indication information in the specific area in the interface of the device, the processor is further configured to:
- display a notification message sent for the first application, in the system notification bar of the device, when the notification message is received; and
- display the icon of the first application together with the notification message.

7. The device according to claim 6, wherein the processor is further configured to:
- set the icon of the first application in the taskbar of the device to indicate that the first application is one of the multiple identical applications in the application group, at least one icon being contained in the taskbar and the at least one icon corresponding to an application currently in a running status.

8. The device according to claim 6, wherein applications in the application group have identical original icons.

9. The device according to claim 6, wherein the notification message is sent by a server corresponding to the first application, or another device.

10. The device according to claim 6, wherein the application group includes an original application and the specified application corresponding to different application identifiers, respectively, and
- wherein the processor is further configured to generate the specified application by: modifying the application identifier of the original application, and storing the modified application identifier of the original application in a system file of the device as the application identifier of the specified application.

11. A non-transitory computer-readable storage medium having stored therein instructions that, when executed by a processor of a terminal, cause the terminal to perform a method for displaying an application interface, the method comprising:
- displaying selection prompting information for prompting a user to select an application from an application group, the application group comprising multiple identical applications that comprise a first application;
- determining the first-application selected by the user in response to the selection prompting information, the first application being a specified application of the application group;
- acquiring an original icon of the first application;
- adding an identifier of the application group at a specific position on the original icon, to obtain an icon of the first application, wherein each application of the application group corresponds to an identifier, and the applications of the application group are distinguished based on the identifiers; and
- displaying application indication information in a specific area in an interface of the terminal, for indicating the specified application of the application group, wherein the application indication information comprises at least one of the identifier or an icon of the application group, and the specific area comprises one or more of a system status bar, a system notification bar, a taskbar, and a display area containing an icon of any application of the application group,
- wherein displaying the application indication information in the specific area in the interface of the terminal comprises:
- displaying a notification message sent for the first application, in the system notification bar of the terminal, when the notification message is received; and
- displaying the icon of the first application together with the notification message.

12. The non-transitory computer-readable storage medium according to claim 11, wherein displaying the application indication information in the specific area in the interface of the terminal comprises:
- setting the icon of the first application in the taskbar of the terminal to indicate that the first application is one of the multiple identical applications in the application group, at least one icon being contained in the taskbar and the at least one icon corresponding to an application currently in a running status.

13. The non-transitory computer-readable storage medium according to claim 11, wherein applications in the application group have identical original icons.

14. The non-transitory computer-readable storage medium according to claim 11, wherein the notification message is sent by a server corresponding to the first application, or another terminal.

15. The non-transitory computer-readable storage medium according to claim 11, wherein the application group includes an original application and the specified application corresponding to different application identifiers, respectively, and
- wherein the method further comprises generating the specified application by: modifying the application identifier of the original application, and storing the modified application identifier of the original application in a system file of the terminal as the application identifier of the specified application.

* * * * *